United States Patent [19]
Morrison

[11] Patent Number: 5,009,479
[45] Date of Patent: Apr. 23, 1991

[54] OPTICAL FIBER COUPLING DEVICE AND METHOD FOR ITS USE

[75] Inventor: Shawn J. Morrison, Saskatoon, Canada

[73] Assignee: Northern Telecom Limited, Montreal, Canada

[21] Appl. No.: 417,624

[22] Filed: Oct. 5, 1989

[30] Foreign Application Priority Data

Sep. 27, 1989 [CA] Canada ............................... 613,580

[51] Int. Cl.$^5$ ............................ G02B 6/26; H01J 5/16
[52] U.S. Cl. ............................... 350/96.15; 350/96.20; 350/320; 250/227.11; 250/227.24
[58] Field of Search ............... 350/96.15, 96.17, 96.16, 350/96.20, 96.21, 320; 250/227.11, 227.16, 227.24

[56] References Cited

U.S. PATENT DOCUMENTS

| | | | |
|---|---|---|---|
| 3,449,036 | 6/1969 | Jacobsen | 350/96.15 X |
| 3,931,518 | 1/1976 | Miller et al. | 250/227 |
| 3,936,631 | 2/1976 | Muska | 250/227 |
| 3,982,123 | 9/1976 | Goell et al. | 250/227 |
| 4,253,727 | 3/1981 | Jeunhomme et al. | 350/96.15 |
| 4,277,134 | 7/1981 | Upton, Jr. | 350/96.20 |
| 4,557,552 | 12/1985 | Newton et al. | 350/96.15 |
| 4,664,732 | 5/1987 | Campbell et al. | 156/158 |
| 4,671,653 | 6/1987 | So et al. | 356/73.1 |
| 4,728,169 | 3/1988 | Campbell et al. | 350/96.15 |
| 4,747,652 | 5/1988 | Campbell et al. | 350/96.15 |
| 4,759,605 | 7/1988 | Shen et al. | 350/96.15 |

FOREIGN PATENT DOCUMENTS

| | | | |
|---|---|---|---|
| 5726807 | 2/1982 | Japan | 350/96.15 X |
| 5958404 | 4/1984 | Japan | 350/96.15 X |

OTHER PUBLICATIONS

"Bend Loss Measurements on High Numerical Aperture Single-Mode Fibers as a Function of Wavelength and Bend Radius", Harris and Castle, IEEE Journal of Lightwave Technology, vol. Lt-4, No. 1, Jan., 1986.

Primary Examiner—Brian Healy

[57] ABSTRACT

An optical coupler comprises a rigid coupling element having a concave surface defining a desired bend profile for an optical fiber, a resiliently deformable bending element having a convex surface which is complementary to the concave surface of the coupling element, and means for urging the bending element toward the coupling element so as to conform an optical fiber placed between the bending element and the coupling element to the desired bend profile. The coupling element comprises a rigid body which has the concave surface, and an optoelectronic device which is carried by the rigid body at a position and orientation for optical coupling between the optoelectronic device and an optical fiber held against the concave surface so as to conform to the desired bend profile.

13 Claims, 1 Drawing Sheet

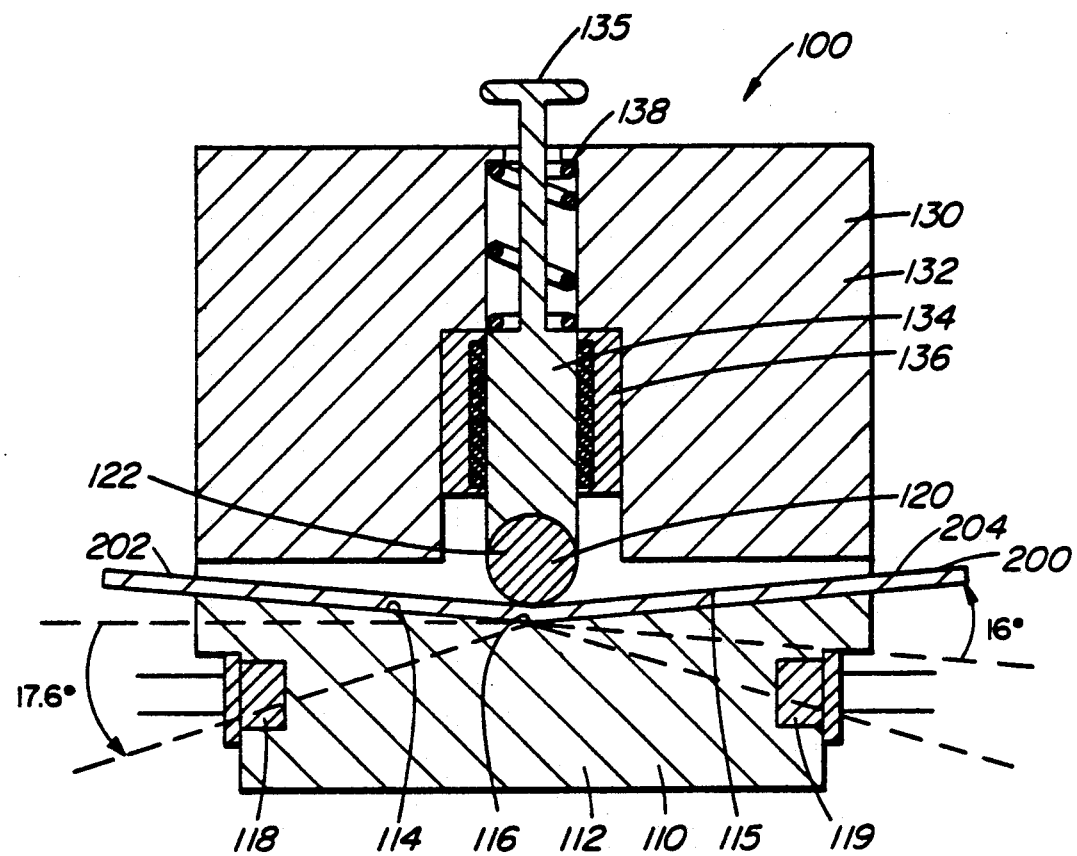

OPTICAL FIBER COUPLING DEVICE AND METHOD FOR ITS USE

FIELD OF THE INVENTION

This invention relates to optical fiber coupling devices and to methods for using such devices to couple optical signals into and out of optical fibers.

BACKGROUND OF THE INVENTION

Technicians responsible for maintaining optical fiber telecommunications systems need optical couplers which can couple optical signals into and out of unbroken optical fibers. The technicians use such coupling devices to identify fibers which are carrying live telecommunications traffic without interrupting such traffic, and to locally launch and detect optical signals during splicing operations.

One type of optical coupler used for such operations comprises a bending element and a coupling element. The bending element and the coupling element have complementary surfaces which define a desired bend profile for an optical fiber which is held between the two complementary surfaces The coupling element is at least partially transparent and includes an optical source or detector which is aligned with the bend in the fiber so as to be optically coupled to the bent fiber.

In some couplers of this type, both the bending element and the coupling element are rigid bodies. In these structures, any mismatch of the complementary surfaces which define the desired bend profile may permit deviation of the fiber from the desired bend profile, thereby degrading the optical coupling characteristics. Such mismatch may also permit movement of the fiber between the complementary surfaces, causing unstable optical coupling characteristics. Moreover, such mismatch may result in highly localized pressures which can permanently deform or damage a coating of the fiber. Thus, to achieve optimum coupling characteristics in these structures, the complementary surface profiles of both the bending element and the coupling element must meet very tight dimensional tolerances, and this may be difficult and expensive to achieve.

In other couplers of this type, the bending element is a rigid body and the coupling element is a relatively deformable body. In these structures, any mismatch in the complementary surfaces which define the desired bend profile is resolved by deformation of the coupling element when the fiber is held between the complementary surfaces. Thus, the surface profile of the rigid bending element effectively controls the bend profile of the fiber, and the dimensional tolerances on the surface profile of the coupling element are relaxed somewhat Because the coupling element deforms to conform to the surface profile of the bending element, the fiber is held tightly between the bending and coupling elements over a greater portion of its length, reducing movement of the fiber and improving the stability of the coupling characteristics. Moreover, deformation of the coupling element spreads localized pressures to reduce permanent deformation of the fiber coating.

Unfortunately, in optical couplers having a rigid bending element and a relatively deformable coupling element, the position of the fiber bend relative to the optical source or detector is not precisely determined, and this may degrade the reproducibility of the optical coupling characteristics. In particular, deformation of the coupling element will move the fiber bend closer to the source or detector, thereby changing the coupling geometry and the resulting coupling characteristics. In successive applications of the coupler to the same fiber or to different fibers, different amounts of compressive force may result in different coupling characteristics.

The problems of known optical couplers as described above are particularly acute when the couplers are used with single mode fibers in applications where relatively weak but reproducible coupling is required, and the coupling must be essentially the same over a broad range of wavelengths. For example, portable test instruments used to identify optical fibers carrying live telecommunications traffic without disrupting that traffic must reliably and reproducibly couple only about 0.5 dB from a single mode telecommunications fiber. If the coupling is much less than 0.5 dB, the instrument may fail to detect live traffic, and a maintenance-induced service outage may result. If the coupling is much more than 0.5 dB, the instrument may disrupt the live traffic and a maintenance-induced service outage may result. Single mode optical fibers can carry a great deal of telecommunications traffic, so such service outages are very serious. Optical signals carried by such fibers may have a wavelength as short as 1200 nm or as long as 1600 nm, so the coupling characteristics of the test instrument must be roughly constant over this wavelength range. Moreover, the coupling characteristics must be roughly constant over the full range of fiber dimensions and over successive measurements on the same or different fibers. The optical couplers described above cannot readily meet these stringent requirements.

SUMMARY OF THE INVENTION

This invention seeks to provide an optical coupler which obviates or mitigates the problems of the optical couplers which are described above. More particularly, this invention seeks to provide an optical coupler which can more readily meet the stringent requirements of single mode fiber test instruments.

To this end, one aspect of the invention provides an optical coupler comprising a rigid coupling element having a concave surface defining a desired bend profile for an optical fiber, a resiliently deformable bending element having a convex surface which is complementary to the concave surface of the coupling element, and means for urging the bending element toward the coupling element so as to conform an optical fiber placed between the bending element and the coupling element to the desired bend profile The coupling element comprises a rigid body which has the concave surface, and an optoelectronic device which is carried by the rigid body at a position and orientation for optical coupling between the optoelectronic device and an optical fiber held against the concave surface so as to conform to the desired bend profile The rigid body may be at least partially transparent, and the optoelectronic device may be embedded in the rigid body for optical coupling between the optoelectronic device and a fiber conforming to the desired bend profile against the concave surface via the rigid body.

The optoelectronic device may be an optical source for launching an optical signal into a fiber conforming to the desired bend profile against the concave surface, or an optical detector for detecting an optical signal in a fiber conforming to the desired bend profile against the concave surface.

The use of a rigid coupling element in combination with a deformable bending element provides the benefits previously provided by a deformable coupling element in combination with a rigid bending element, without incurring the disadvantages of this latter arrangement. In particular, any mismatch in the complementary surfaces which define the desired bend profile is resolved by deformation of the bending element when the fiber is held between the complementary surfaces. Thus, the surface profile of the rigid coupling element effectively controls the bend profile of the fiber, and the dimensional tolerances on the surface profile of the bending element are relaxed somewhat. Because the bending element deforms to conform to the surface profile of the coupling element, the fiber is held tightly between the bending and coupling elements over a greater portion of its length, reducing movement of the fiber and improving the stability of the coupling characteristics. Deformation of the bending element spreads localized pressures to reduce permanent deformation of the fiber coating. Moreover, because the coupling element is rigid, the position of the fiber bend relative to the optical source or detector is precisely determined, so as to provide reproducible optical coupling characteristics in successive applications of the coupler to the same fiber or to different fibers.

Another aspect of the invention provides an optical coupler comprising a coupling element having a concave surface which defines a desired bend profile for an optical fiber. The bend profile has a bend radius between 1 mm and 3 mm and a bend angle between 10 degrees and 20 degrees. The coupling element comprises a body having the concave surface and an optoelectronic device carried by the body at a position and orientation for optical coupling between the optoelectronic device and an optical fiber held against the concave surface so as to conform to the desired bend profile. The optical coupler further comprises a bending element having a convex surface which is complementary to the concave surface of the coupling element, and means for urging the bending element toward the coupling element so as to conform an optical fiber placed between the concave surface of the coupling element and the convex surface of the bending element to the desired bend profile.

The bend profile having a bend radius between 1 mm and 3 mm and a bend angle between 10 degrees and 20 degrees provides optical coupling which is relatively insensitive to wavelength for wavelengths between 1200 nm and 1600 nm. Bend profiles having larger bend radii show a greater variation in optical coupling between 1200 nm and 1600 nm. Bend profiles having larger bend angles may exhibit periodic variations in optical coupling with wavelength for wavelengths between 1200 nm and 1600 nm due to interference phenomena.

Another aspect of the invention provides a method for coupling an optical signal between an optical fiber and an optoelectronic device. The method comprises the steps of providing a rigid coupling element having a concave surface defining a desired bend profile for an optical fiber, providing a resiliently deformable bending element having a convex surface which is complementary to the concave surface of the coupling element, placing an optical fiber between the convex surface of the bending element and the concave surface of the coupling element, and urging the bending element toward the coupling element so as to conform the optical fiber to the desired bend profile. The coupling element comprises a rigid body which includes the concave surface, and an optoelectronic device which is carried by the rigid body at a position and orientation for optical coupling between the optoelectronic device and the fiber conforming to the desired bend profile against the concave surface.

BRIEF DESCRIPTION OF THE DRAWING

Embodiments of the invention are described below by way of example only. Reference will be made to an accompanying drawing, the only FIGURE of which is a cross-sectional view of an optical coupler according to an embodiment of the invention.

DETAILED DESCRIPTION OF EMBODIMENTS

Referring to the FIGURE, an optical coupler 100 comprises a rigid coupling element 110, a resiliently deformable bending element 120, and a housing assembly 130.

The coupling element 110 comprises a rigid body in the form of a transparent block 112 of polycarbonate. The block 112 has a concave surface which comprises two planar surface sections 114, 115 meeting at a rounded internal edge 16. The planar surface sections 114, 115 define a bend angle of 16 degrees, and the rounded internal edge 116 defines a bend radius of 2 mm. The coupling element 110 further comprises two optoelectronic devices in the form of optical detectors 118, 119.

The bending element 120 comprises a rod 122 of nitrile having a Shore A hardness between 70 and 80. The rod 122 has an external radius of 1.75 mm. The external radius of the rod 122 is made slightly smaller than the internal radius of the rounded internal edge 116 of the block 112 to allow for the thickness of an optical fiber 200 to be placed between the block 112 and the rod 122.

The housing assembly 130 comprises a housing member 132 which is fixed to the coupling element 110, a plunger 134 which carries the bending element 120, a linear slide mechanism 136 which slidably carries the plunger 134 on the housing member 132 and a spring 138 which acts between the housing member 132 and the plunger 134 to urge the bending element 120 toward the coupling element 110. The plunger 134 includes a handle 135 by which the plunger 134 and the bending element 120 can be moved away from the coupling element 110 against the urging of the spring 138.

In use of the optical coupler 100, the bending element 120 is moved away from the coupling element 110 by means of the handle 135, an optical fiber 200 is placed between the convex surface of the bending element 120 and the concave surface of the coupling element 110, and the handle 135 is released so that the bending element 120 is urged toward the coupling element 110 by the spring 138. The bending element 120 urges the fiber 200 against the concave surface of the coupling element 130 so as to conform the fiber 200 to a predetermined bend profile defined by the concave surface of the coupling element 130.

The convex surface of the bending element 120 is complementary to the concave surface of the coupling element 130 and therefore also acts to conform the fiber 200 to the same predetermined bend profile as the concave surface of the coupling element. The bending element 120 is resiliently deformable, and therefore will deform to match the bending profile defined by concave surface of the coupling element 110 if the convex surface of the bending element 120 is not perfectly complementary to the concave surface of the coupling element 110.

When the optical fiber 200 conforms to the predetermined bend profile against the concave surface of the coupling element 110, the detectors 118, 119 are properly positioned and oriented for detecting optical signals coupled between the bent fiber 200 and the detectors 118, 119 via the transparent block 112. The detectors 118, 119 are slightly displaced from notional extensions of the planar surface sections to allow for refraction of light coupled from the optical fiber 200 into the transparent block 112. One of the detectors 118, 119 is positioned and oriented for coupling with optical signals propagating in one direction along the optical fiber 200, and the other of the detectors 118, 119 is positioned and oriented for coupling with optical signals propagating in an opposite direction along the optical fiber 200.

In alternative embodiments, the bend angle may range from 10 degrees to 20 degrees, and the bend radius may range from 1 mm to 3 mm. Bend profiles having bend radii and a bend angles within these ranges are relatively insensitive to wavelength for wavelengths between 1200 nm and 1600 nm. Mathematical modelling indicates that bend profiles having larger bend radii show a greater variation in optical coupling between 1200 nm and 1600 nm, and that bend profiles having larger bend angles may exhibit periodic variations in optical coupling with wavelength for wavelengths between 1200 nm and 1600 nm due to interference phenomena.

One or both of the optical detectors 118, 119 may be replaced by an optical source for launching an optical signal into the bent fiber 200. These and other embodiments are within the scope of the invention as claimed below.

I claim:

1. An optical coupler, comprising:
   a rigid coupling element having a concave surface defining a desired bend profile for an optical fiber, the coupling element comprising a rigid body having the concave surface and an optoelectronic device carried by the rigid body at a position and orientation for optical coupling between the optoelectronic device and an optical fiber held against the concave surface so as to conform to the desired bend profile;
   a resiliently deformable bending element having a convex surface which is complementary to the concave surface of the coupling element; and
   means for urging the bending element toward the coupling element so as to conform an optical fiber placed between the concave surface of the coupling element and the convex surface of the bending element to the desired bend profile.

2. An optical coupler as defined in claim 1, wherein the rigid body is at least partially transparent, and the optoelectronic device is embedded in the rigid body for optical coupling between the optoelectronic device and a fiber conforming to the desired bend profile against the concave surface via the rigid body.

3. An optical coupler as defined in claim 2, wherein the concave surface comprises two planar surface sections meeting at a rounded internal edge surface, the planar surface sections defining a bend angle and the rounded internal edge surface defining a bend radius; and the convex surface comprises a rounded external edge surface defining a radius which is slightly less than the bend radius defined by the rounded internal edge surface of the concave surface.

4. An optical coupler, comprising:
   a rigid coupling element having two planar surface sections meeting at a rounded internal edge surface, the planar surface sections defining a bend angle between 10 degrees and 20 degrees and the rounded internal edge surface defining a bend radius between 1 mm and 3 mm, the bend angle and the bend radius defining a desired bend profile for an optical fiber, the coupling element comprising a rigid body which is at least partially transparent and which has the planar surface sections and the internal edge surface, and an optoelectronic device embedded in the rigid body at a position and orientation for optical coupling between the optoelectronic device and an optical fiber held against the concave surface so as to conform to the desired bend profile;
   a resiliently deformable bending element having a rounded external edge surface defining a radius which is slightly less than the bend radius defined by the rounded internal edge surface of the coupling element; and
   means for urging the bending element toward the coupling element so as to conform an optical fiber placed between the planar surface sections and the rounded internal edge surface of the coupling element and the rounded external edge surface of the bending element to the desired bend profile.

5. An optical coupler as defined in claim 4, wherein the bend angle is 16 degrees and the bend radius is 2 mm.

6. An optical coupler as defined in claim 3, wherein the rigid body comprises a block of polycarbonate and the bending element comprises a rod of nitrile having a Shore A hardness between 70 and 80.

7. An optical coupler, comprising:
   a rigid coupling element having a concave surface defining a desired bend profile for an optical fiber, the coupling element comprising a rigid body having the concave surface and two optoelectronic devices carried by the rigid body at respective positions and orientations for optical coupling between each optoelectronic device and an optical fiber held against the concave surface so as to conform to the desired bend profile, one of the optoelectronic devices being positioned and oriented for coupling with optical signals propagating in one direction along the optical fiber, and the other of the optoelectronic devices being positioned and oriented for coupling with optical signals propagating in an opposite direction along the optical fiber;
   a resiliently deformable bending element having a convex surface which is complementary to the concave surface of the coupling element; and
   means for urging the bending element toward the coupling element so as to conform an optical fiber placed between the concave surface of the coupling element and the convex surface of the bending element to the desired bend profile.

8. An optical coupler as defined in claim 1, wherein the optoelectronic device comprises an optical source for launching an optical signal into an optical fiber conforming to the desired bend profile against the concave surface.

9. An optical fiber coupler as defined in claim 1, wherein the optoelectronic device comprises an optical detector for detecting an optical signal in an optical fiber conforming to the desired bend profile against the concave surface.

10. An optical fiber, comprising:
a rigid coupling element having a concave surface defining a desired bend profile for an optical fiber, the coupling element comprising a rigid body having the concave surface and an optoelectronic device carried by the rigid body at a position and orientation for optical coupling between the optoelectronic device and an optical fiber held against the concave surface so as to conform to the desired bend profile;
a resiliently deformable bending element having a convex surface which is complementary to the concave surface of the coupling element;
a housing assembly, the housing assembly comprising a housing member fixed to the coupling element, a plunger carrying the bending element, and a linear slide mechanism slidably carrying the plunger on the housing member; and
a spring which acts between the housing member and the plunger to urge the bending element toward the coupling element so as to conform an optical fiber placed between the concave surface of the coupling element and the convex surface of the bending element to the desired bend profile.

11. An optical fiber coupler as defined in claim 10, wherein the plunger comprises a handle by which the plunger and the bending element can be moved away from the coupling element against the urging of the spring.

12. An optical coupler, comprising:
a coupling element having a concave surface defining a desired bend profile for an optical fiber, said bend profile having a bend radius between 1 mm and 3 mm and a bend angle between 10 degrees and 20 degrees, the coupling element comprising a body having the concave surface and an optoelectronic device carried by the body at a position and orientation for optical coupling between the optoelectronic device and an optical fiber held against the concave surface so as to conform to the desired bend profile;
a bending element having a convex surface which is complementary to the concave surface of the coupling element; and
means for urging the bending element toward the coupling element so as to conform an optical fiber placed between the concave surface of the coupling element and the convex surface of the bending element to the desired bend profile.

13. A method for coupling an optical signal between an optical fiber and an optoelectronic device, the method comprising:
providing a rigid coupling element having a concave surface defining a desired bend profile for an optical fiber, the coupling element comprising a rigid body which includes the concave surface and an optoelectronic device which is carried by the rigid body at a position and orientation for optical coupling between the optoelectronic device and the fiber conforming to the desired bend profile against the concave surface;
providing a resiliently deformable bending element having a convex surface which is complementary to the concave surface of the coupling element;
placing an optical fiber between the convex surface of the bending element and the concave surface of the coupling element; and
urging the bending element toward the coupling element so as to conform the optical fiber to the desired bend profile.

* * * * *